UNITED STATES PATENT OFFICE.

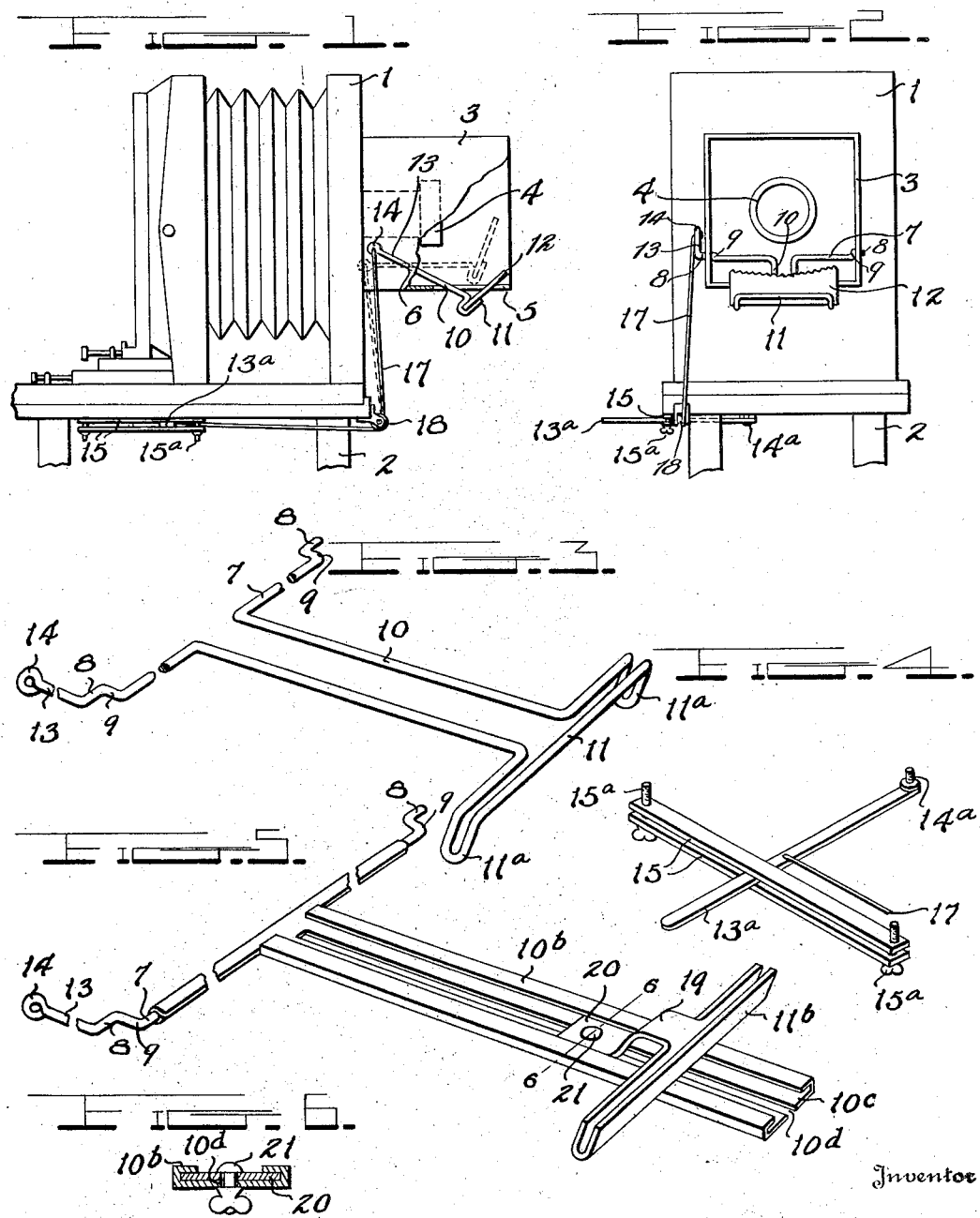

CHARLES R. HOWARD, OF NEWARK, NEW YORK.

COMBINATION LENS-HOOD AND VIGNETTER.

1,137,975.  Specification of Letters Patent.  Patented May 4, 1915.

Application filed November 25, 1914. Serial No. 874,041.

*To all whom it may concern:*

Be it known that I, CHARLES R. HOWARD, a citizen of the United States, residing at Newark, in the county of Wayne and State of New York, have invented certain new and useful Improvements in Combination Lens-Hoods and Vignetters, of which the following is a specification.

The present invention relates to a combined lens hood and vignetter for cameras, and has for its object to provide a device of this character which embodies novel features of construction whereby it can be readily mounted upon a camera and quickly adjusted to the desired position.

A further object of the invention is to provide a device of this character which is comparatively simple and inexpensive in its construction, which can be easily operated with one hand when the operator is in position behind the camera, which is noiseless in its operation, and which can be permitted to fall into an inoperative position when it is not desired to use a vignetter.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawing, in which:—

Figure 1 is a side elevation of a camera provided with a lens hood and vignetter constructed in accordance with the invention, portions of the lens hood being broken away and shown in section. Fig. 2 is a front elevation of the same. Fig. 3 is an enlarged detail perspective view of the vignetter carrying arm. Fig. 4 is a detail view of the clamping bars between which the swinging end of the operating lever slides. Fig. 5 is an enlarged perspective view showing a modified construction of the vignetter carrying arm, portions of the shaft being broken away, and Fig. 6 is a transverse sectional view on the line 6—6 of Fig. 5.

Corresponding and like parts are referred to in the following description and indicated in all the views of the drawing by the same reference characters.

Specifically describing the present embodiment of the invention, the numeral 1 designates a camera of the conventional construction and 2 a stand upon which the camera is mounted. A hood 3 projects from the front of the camera so as to surround the camera lens 4 on all sides. The bottom of the hood 3 is formed with a clearance opening 5 through which the vignetter board may be moved up and down, while pivot openings 6 are formed in opposite sides of the hood toward the bottom thereof. A transverse shaft 7 extends across the hood 3 at a point under the lens 4, opposite ends of the shaft being formed with the laterally off-set pivot studs 8 which are loosely received within the pivot openings 6 of the hood. Shoulders 9 at the junction of the offset pivot studs 8 and the ends of the shaft 7 engage the inner sides of the hood 3 so as to hold the shaft 7 against longitudinal displacement.

A vignetter arm 10 which is rigid with the shaft 7 projects laterally therefrom and terminates in a cross head 11 which is formed with a suitable pocket adapted to loosely receive the lower edge of a vignetter board 12. Projecting rearwardly from the extremity of one of the pivot studs 8 is a crank arm 13 which provides a means for rocking the shaft 7 and is shown in the present instance as terminating in an eye 14. As shown more clearly by Fig. 3, the shaft, vignetter arm and cross head may be readily formed from a single length of wire. When thus constructed an intermediate portion of the shaft 7 may be formed with a long laterally projecting crimp to provide the vignetter arm 10, the extremity of the crimp being flattened to provide a transverse loop projecting laterally upon opposite sides of the vignetter arm and the extremities of the loop being deflected downwardly at 11ª to form a pocket for the reception of the vignetter board 12.

An operating lever 13ª is arranged under the camera stand at the rear thereof, one end of the said operating lever projecting laterally from the stand, while the opposite end thereof is pivotally connected thereto as indicated at 14ª. This lever 13ª passes between a pair of straight bars 15 which are formed of resilient material and have the ends thereof adjustably connected by means of clamping screws 15ª. These clamping screws 15ª also serve as a means for attaching the straight bars 15 to the camera stand, and by tightening the screws the resilient bars 15 may be caused to have a sufficient amount of frictional engagement with the operating lever 13ª to hold the latter in an adjusted position. A flexible cable such as the cord 17 connects the operating lever 13ª to the eye 14 of the crank arm 13, said cable being shown as passing around a guide pulley 18 at the front of the camera stand 2. With this construction it will be obvious that by swinging the operating lever 13ª to the front or to the rear the flexible cable 17 may be let out or taken in as may be required to adjust the vignetter in the required manner. The frictional engagement between the bars 15 and the operating lever 13ª will hold the latter in an adjusted position without the necessity of tightening any thumb screw, thereby enabling the operator to obtain a very fine adjustment of the vignetter board without difficulty while in position behind the camera. The tension of the resilient metal bars 15 may be kept sufficiently tight by properly adjusting the clamping screws 15ª so that the operating lever 13ª can be moved back and forth without difficulty, although when released by the hand it will be held against further movement in either direction.

The weight of the vignetter board 12 normally tends to swing the arm 10 downwardly so that the vignetter assumes an inoperative position, as indicated by full lines upon Fig. 1. However, by swinging the operating lever 13ª rearwardly the crank arm 13 will be swung downwardly by the pull produced upon the flexible cable 17 and the vignetter board thereby swung upwardly into operative position, as indicated by dotted lines upon Fig. 1. Any desired elevation of the vignetter board can be readily obtained by suitably manipulating the operating lever 13ª, and the parts will then be locked in an adjusted position by the frictional engagement of the spring bars 15 with the lever 13ª.

A modification is shown by Fig. 5 in which the vignetter arm 10ᵇ is formed with a longitudinal guideway 10ᶜ having a slot 10ᵈ in the base thereof. The vignetter board supporting cross head 11ᵇ is adjustably mounted upon the vignetter arm 10ᵇ so as to be moved in and out thereon and clamped in an adjusted position. For this purpose the cross head 11ᵇ is shown as formed with an arm 19 terminating in a slide 20 which is mounted within the guideway 10ᶜ of the vignetter arm 10ᵇ. A clamping screw 21 is carried by the slide 20 and passes through the slot 10ᵈ of the vignetter arm 10ᵇ. When this screw is loosened the slide can be moved in and out upon the vignetter arm 10ᵇ so as to set the vignetter board at any desired distance from the camera lens 4. The parts may then be rigidly clamped in position by tightening the screw 21. The transverse shaft 7 of the modified construction, as well as the manner of mounting the same upon the lens hood 3 and connecting it to the operating lever 13ª, are exactly as previously described, the only difference being the manner of constructing the vignetter arm and cross head and adjustably mounting the said cross head upon the vignetter arm.

Having thus described the invention, what I claim as new and desire to secure by Letters Patent, is:—

1. A combined lens hood and vignetter for cameras, including a lens hood, a transverse shaft extending across the lens hood and journaled thereon, a vignetter arm rigid with the transverse shaft and projecting laterally therefrom, a vignetter board carried by the vignetter arm, and means for rotating the shaft to adjust the position of the vignetter board within the hood.

2. A combined lens hood and vignetter for cameras, including a lens hood, a transverse shaft extending across the same and journaled thereon, a vignetter arm rigid with the shaft and projecting laterally therefrom, a vignetter board, a cross head carried by the vignetter arm and formed with a pocket to receive the vignetter board, a crank arm rigid with the shaft, a finger actuated adjusting member adapted to be mounted upon the camera stand, and an operative connection between the finger actuating adjusting member and the crank arm so that the shaft may be rotated to adjust the position of the vignetter board within the hood.

In testimony whereof I affix my signature in presence of two witnesses.

CHARLES R. HOWARD.

Witnesses:
    Ernest F. Fox,
    M. J. Baylard.